United States Patent
Lee

(10) Patent No.: US 7,372,319 B1
(45) Date of Patent: May 13, 2008

(54) CONSTANT BOOSTED VOLTAGE GENERATOR CIRCUIT FOR FEEDBACK SWITCHES IN A SWITCHED CAPACITOR CIRCUIT

(75) Inventor: Bumha Lee, Pleasanton, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 107 days.

(21) Appl. No.: 11/339,232

(22) Filed: Jan. 24, 2006

Related U.S. Application Data

(60) Provisional application No. 60/717,908, filed on Sep. 16, 2005.

(51) Int. Cl.
*G05F 1/10* (2006.01)
*G05F 3/02* (2006.01)

(52) U.S. Cl. .................................... 327/536
(58) Field of Classification Search ............... 327/536
See application file for complete search history.

(56) References Cited

U.S. PATENT DOCUMENTS

| | | | |
|---|---|---|---|
| 5,587,667 A * | 12/1996 | Inami et al. ............. | 326/17 |
| 5,801,577 A * | 9/1998 | Tailliet ................... | 327/536 |
| 6,297,688 B1 * | 10/2001 | Nakamura ............... | 327/538 |
| 7,068,094 B1 * | 6/2006 | Jamal et al. ............. | 327/541 |
| 2006/0176102 A1 * | 8/2006 | Ayres et al. ............. | 327/536 |

OTHER PUBLICATIONS

Lee et al., A 14bit 155MSPS Pipelined CMOS ADC with 84.6dB SFDR at 117MHz, Santa Clara, California, 13 pages, no date.

* cited by examiner

*Primary Examiner*—Quan Tra
(74) *Attorney, Agent, or Firm*—Patent Law Group LLP; Carmen C. Cook

(57) ABSTRACT

A boosted voltage generator circuit includes a precharge voltage generator circuit and a first capacitor. The precharge voltage generator circuit receives a first DC voltage and a first power supply voltage and generates a precharge voltage having a first voltage value. The precharge voltage is inversely proportional to variations in the first power supply voltage. The first capacitor is connected between the precharge voltage node and the second power supply voltage during a first phase to be precharged to the precharge voltage and the first capacitor is connected between the boosted voltage output node and the first power supply voltage during a second phase to apply a boosted voltage at the boosted voltage output node where the boosted voltage has a voltage value being the sum of the precharge voltage and the first power supply voltage.

11 Claims, 4 Drawing Sheets

CONSTANT BOOSTED VOLTAGE GENERATOR CIRCUIT FOR FEEDBACK SWITCHES IN A SWITCHED CAPACITOR CIRCUIT

CROSS-REFERENCE TO RELATED APPLICATION

This application claims the benefit of U.S. Provisional Patent Application Ser. No. 60/717,908, filed on Sep. 16, 2005, having the same inventorship hereof, which application is incorporated herein by reference in its entirety.

FIELD OF THE INVENTION

The invention relates to a circuit and method for generating a constant voltage with respect to power supply voltage variations and, in particular, to a boosted voltage generator circuit for generating a constant voltage for feedback switches in a switched capacitor circuit.

DESCRIPTION OF THE RELATED ART

Switched capacitor circuits such as that shown in FIG. 1 have been being widely used in analog circuit design, especially when a highly accurate transfer function is required. Switched capacitor circuits can realize accurate transfer function because good matching capacitors can be readily attained as compared to any other passive components available in a low cost CMOS fabrication process. Currently, poly-to-poly capacitors are common, but metal-insulator-metal (MIM) capacitors have also been used in modern deep sub-micron processes. A switched capacitor circuit typically includes a high DC gain amplifier combined with a capacitive network to achieve an accurate transfer function. The high DC gain amplifier can be implemented with a gain-boosted telescopic and/or multi-stage amplifier topologies. When the application demands increased target resolution and operating speed, the sampling and feedback capacitor sizes need to be substantially increased to meet the target signal-to-noise ratio (SNR) with a given signal swing. Meanwhile, the "on" resistance of the switches in the capacitive network needs to be made as small as possible.

Referring to FIG. 1, a switched capacitor circuit 10 includes an amplifier AMP having it's input terminals T1 and T2 coupled to a pair of sampling capacitors $C_{SP}$ and $C_{SN}$. Sampling capacitors $C_{SP}$ and $C_{SN}$ are switchably connected to a first DC common mode voltage $V_{CM1}$. The switches connecting the left plate of sampling capacitors $C_{SP}$ and $C_{SN}$ to common mode voltage $V_{CM1}$ are not shown in FIG. 1 to simplify the drawing. Typically, the switches connecting the common mode voltage $V_{CM1}$ to the sampling capacitors are made to be large enough to reduce "on" resistance without limiting overall circuit performance in terms of stability and settling time.

Switched capacitor circuit 10 also includes a pair of feedback capacitors $C_{FP}$ and $C_{FN}$. The left plates of the feedback capacitors $C_{FP}$ and $C_{FN}$ are connected back to the respective input terminals T1 and T2 of the amplifier AMP. The right plates of the feedback capacitors $C_{FP}$ and $C_{FN}$ are connected through respective switches $S_P$ and $S_N$ to the output terminals OUTP and OUTN of amplifier AMP. Finally, switched capacitor circuit 10 also includes a pair of loading capacitors $C_{LP}$ and $C_{LN}$ switchably connected to the output terminals OUTP, OUTN of amplifier AMP. The switches between the loading capacitors $C_{LP}$ and $C_{LN}$ and output terminals OUTP and OUTN are omitted in FIG. 1 to simplify the drawing. Typically, the switches connected to the output terminals OUTP, OUTN of amplifier AMP are less sensitive to settling time and stability issues and therefore are not critical with respect to the performance of the switched capacitor circuit. The right plates of loading capacitors $C_{LP}$ and $C_{LN}$ are connected to a second DC common mode voltage $V_{CM2}$.

In switched capacitor circuit 10, switches $S_P$ and $S_N$ connecting feedback capacitors $C_{FP}$ and $C_{FN}$ to the output terminals OUTP and OUTN of amplifier AMP are preferably switches with small "on" resistance and small parasitic capacitance. Small "on" resistance and small parasitic capacitance switches are even more critical when the switch capacitor circuit is applied in applications requiring higher resolution and higher operating speed. FIG. 2 is an equivalent circuit diagram illustrating conceptually the negative feedback circuit depicted in FIG. 1. The feedback switch ($S_P$ or $S_N$) is denoted as a resistor $R_F$. The feedback factor β for the feedback circuit is given as:

$$\beta = \frac{C_F}{SR_F C_S C_F + C_S + C_F}.$$

When the feedback switches introduce resistance in the feedback loop, the feedback network now has an AC component.

When the feedback switch has a finite amount of "on" resistance, the resistance introduces an AC component to the feedback loop and the feedback network is no longer a constant value over the frequency domain. Instead, a pole located at $(R_F \cdot C_S \perp C_F)^{-1}$ acts as a third pole in the loop transfer function. This third pole must be located at a high enough frequency to minimize the whole loop settling behavior.

To reduce the "on" resistance of the feedback switches so that the switches do not negatively impact the feedback loop performance, the feedback switches are often implemented as a large size transmission gate (a pair of NMOS and PMOS transistors) as shown in FIG. 3. However, the parasitic capacitance of the large transmission gates substantially increases the load capacitance at the amplifier AMP output terminals OUTP and OUTN. The parasitic capacitance of the large transmission gates, being coupled in series with the feedback capacitors, also reduces the parasitic pole frequency in the feedback network. As a result, using a large size transmission gate as the feedback switch actually reduces the operation speed of the circuit. In many high resolution and high speed switched capacitor circuits, the parasitic capacitance from the transmission gate can become a big portion of the whole capacitive load at amplifier AMP output nodes.

Other solutions for reducing the "on" resistance of the feedback switch are to use a bootstrapped feedback switch as shown in FIG. 4. In FIG. 4, the gate voltage for turning on the feedback switch $S_P$ or $S_N$ is derived from the output voltage of the amplifier AMP and is boosted by the charge stored on the capacitor $C_{BP}$ or $C_{BN}$. However, this type of bootstrapping technique is not satisfactory because the gate voltage on the NMOS transistor implementing the feedback switch $S_P$ or $S_N$ will drift when the output voltage of the amplifier slews. As a result, the "on" resistance of the feedback switches varies in operation and the feedback switches become variable resistance devices. When the resistance of the feedback switches varies, extra time for the local loop to settle is required. The settling time for the entire circuit is also extended. However, a bootstrapped gate technique is commonly applied in input sampling network for better dynamic performance at high frequency input condition due to the constant switch turn on resistance in the first order.

In summary, bootstrapping for feedback switch causes longer loop settling time due to the local feedback loop around the switch, and large transmission gate for feedback switch heavily adds capacitive loading on amplifier output node and also feedback loop. Neither of these conventional solutions for reducing the "on" resistance of the feedback switch in the switched capacitor circuit is satisfactory.

SUMMARY OF THE INVENTION

According to one embodiment of the present invention, a boosted voltage generator circuit includes a precharge voltage generator circuit and a first capacitor. The precharge voltage generator circuit receives a first DC voltage and a first power supply voltage and generates a precharge voltage having a first voltage value on a precharge voltage node. The precharge voltage is inversely proportional to variations in the first power supply voltage. The first capacitor has a first plate switchably connected to the precharge voltage node and switchably connected to a boosted voltage output node and a second plate switchably connected to the first power supply voltage and switchably connected to a second power supply voltage. In operation, the first capacitor is connected between the precharge voltage node and the second power supply voltage during a first phase to be precharged to the precharge voltage and the first capacitor is connected between the boosted voltage output node and the first power supply voltage during a second phase to apply a boosted voltage at the boosted voltage output node where the boosted voltage has a voltage value being the sum of the precharge voltage and the first power supply voltage.

The present invention is better understood upon consideration of the detailed description below and the accompanying drawings.

DETAILED DESCRIPTION OF THE PREFERRED EMBODIMENTS

Figure 1:
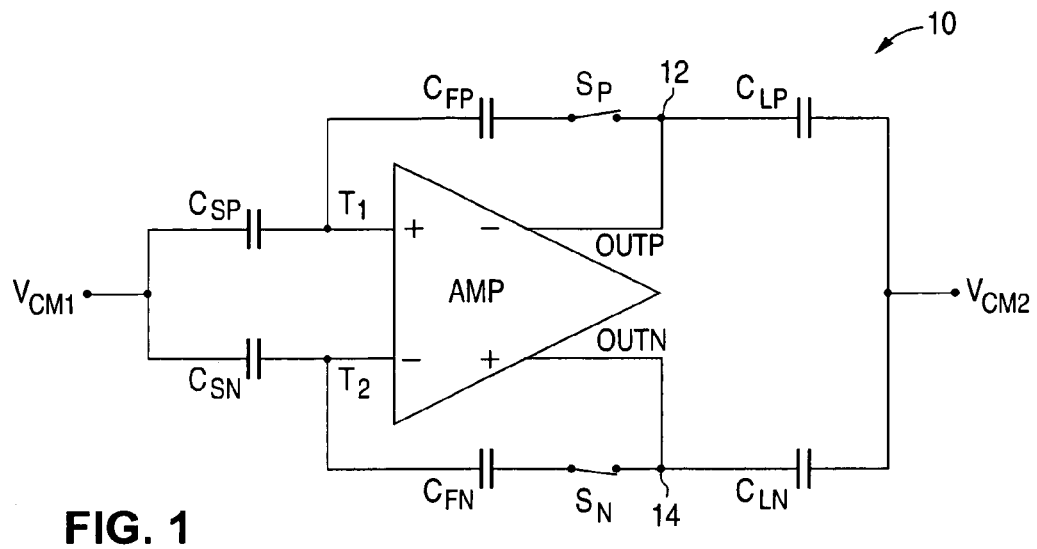
FIG. 1 is a circuit diagram of a conventional switched capacitor circuit.
Figure 2:
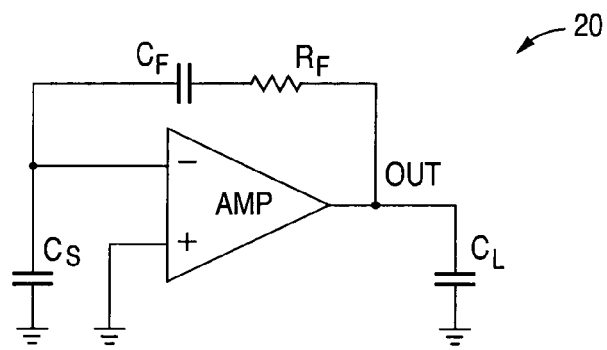
FIG. 2 is an equivalent circuit diagram illustrating conceptually the negative feedback circuit depicted in FIG. 1.
Figure 3:
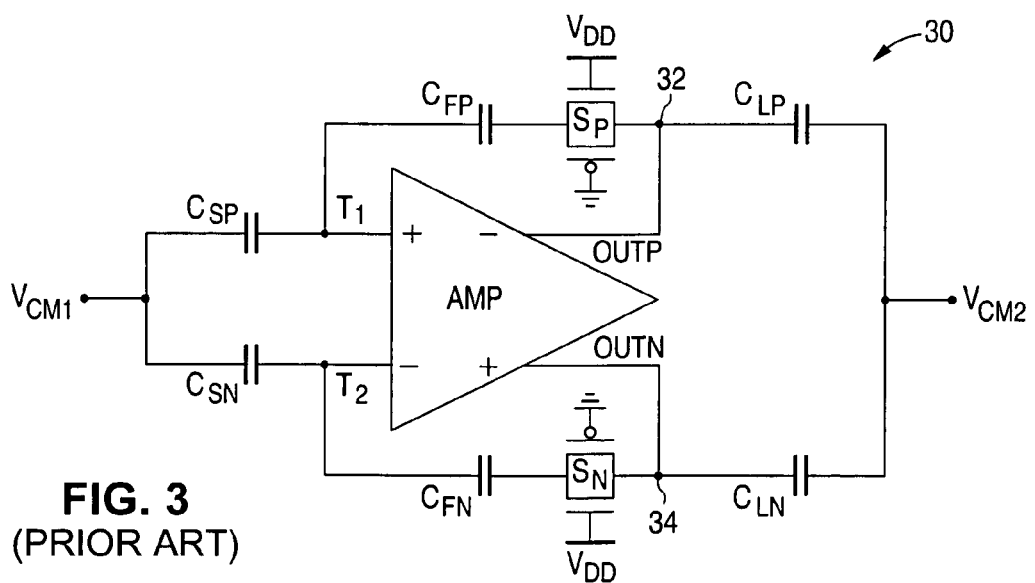
FIG. 3 is a circuit diagram of a conventional switched capacitor circuit where transmission gates are used to implement the feedback switches.
Figure 4:
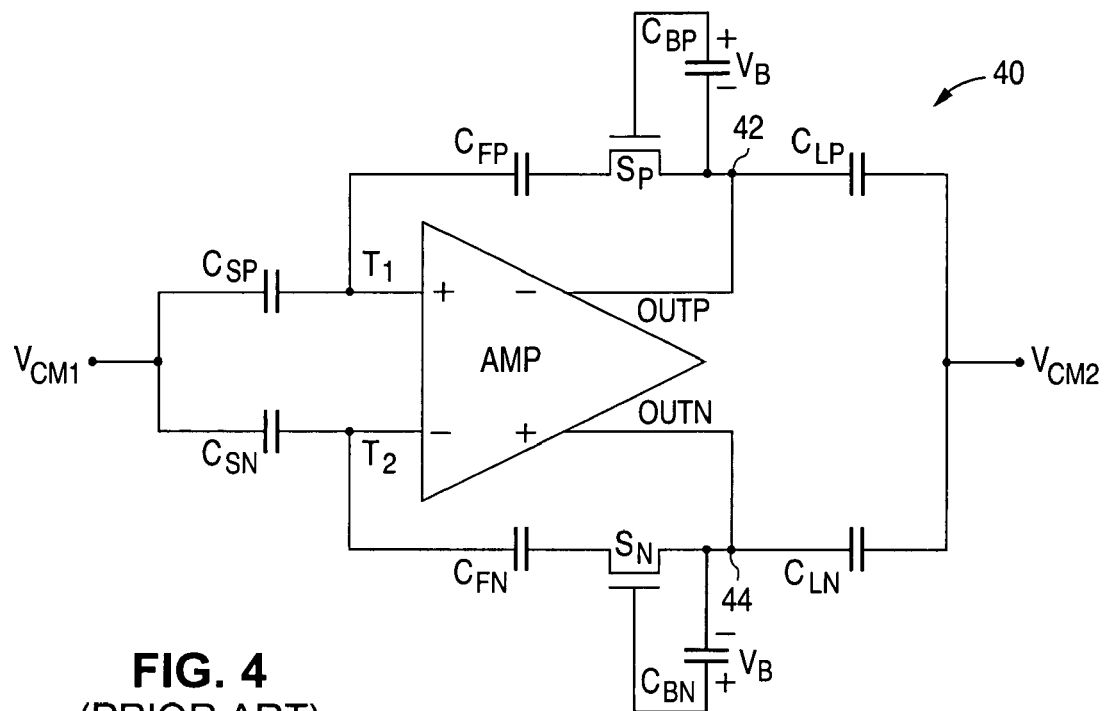
FIG. 4 is a circuit diagram of a conventional switched capacitor circuit including bootstrapped feedback switches.

In accordance with the principles of the present invention, a boosted voltage generator circuit is used to generate a constant boosted voltage for driving one or more feedback switches in a switched capacitor circuit. The constant boosted voltage ensures a small "on" resistance for the feedback switches so that the size of the feedback switches can be minimized. When the size of the feedback switches is minimized, the capacitive loading on the amplifier output node introduced by the feedback switches is reduced and faster settling time in a single-stage amplifier and more stable settling behavior in a multi-stage amplifier can be achieved. An important advantage of the boosted voltage generator circuit is that the boosted voltage thus generated is independent of power supply voltage variations so that the on-resistance can remain stable despite drifts in the power supply voltage.

The boosted voltage generator circuit of the present invention generates a boosted voltage that is kept as constant as possible over power supply voltage variations. In this manner, the "on" resistance of the feedback switch is kept constant and the output settling time for the amplifier of the switched capacitor circuit is made faster.

Because the constant boosted voltage generated by the boosted voltage generator circuit of the present invention is used to drive the feedback switches in a switched capacitor circuit and not to drive the sampling switches and sampling capacitors, the voltage value of the constant boosted voltage only needs to have a value sufficient to minimize the "on" resistance of the feedback switches within a certain limit as well as minimize the parasitic capacitance as much as possible. It is not critical for the boosted voltage to have a specific voltage value to provide a specific "on" resistance. In one embodiment, the feedback switch is implemented as a single NMOS transistor (such as an N-channel MOSFET) and the boosted voltage is selected by taking the lowest voltage on the amplifier output terminals which is the source voltage of the NMOS transistor and determining the amount of gate voltage that can be applied to drive the NMOS transistor to turn on the NMOS transistor without degrading the reliability of the NMOS transistor. That is, the boosted voltage is selected to give a maximum gate-to-source voltage that can be applied to the NMOS transistor without degrading the reliability of the NMOS transistor.

In one embodiment, a low noise technique is applied to allow the use of a low speed and noisy voltage source inside the generator circuit as the precharge voltage across a boosting capacitor in a high dynamic performance circuit. Furthermore, in another embodiment, the boosted voltage is generated from a source without parasitic capacitance or inductance. Thus, according to one embodiment of the present invention, the boosted voltage is generated directly from the power supply voltage. In other embodiments, the boosted voltage can be generated from other DC voltage source that is available on the integrated circuit.

Figure 5:
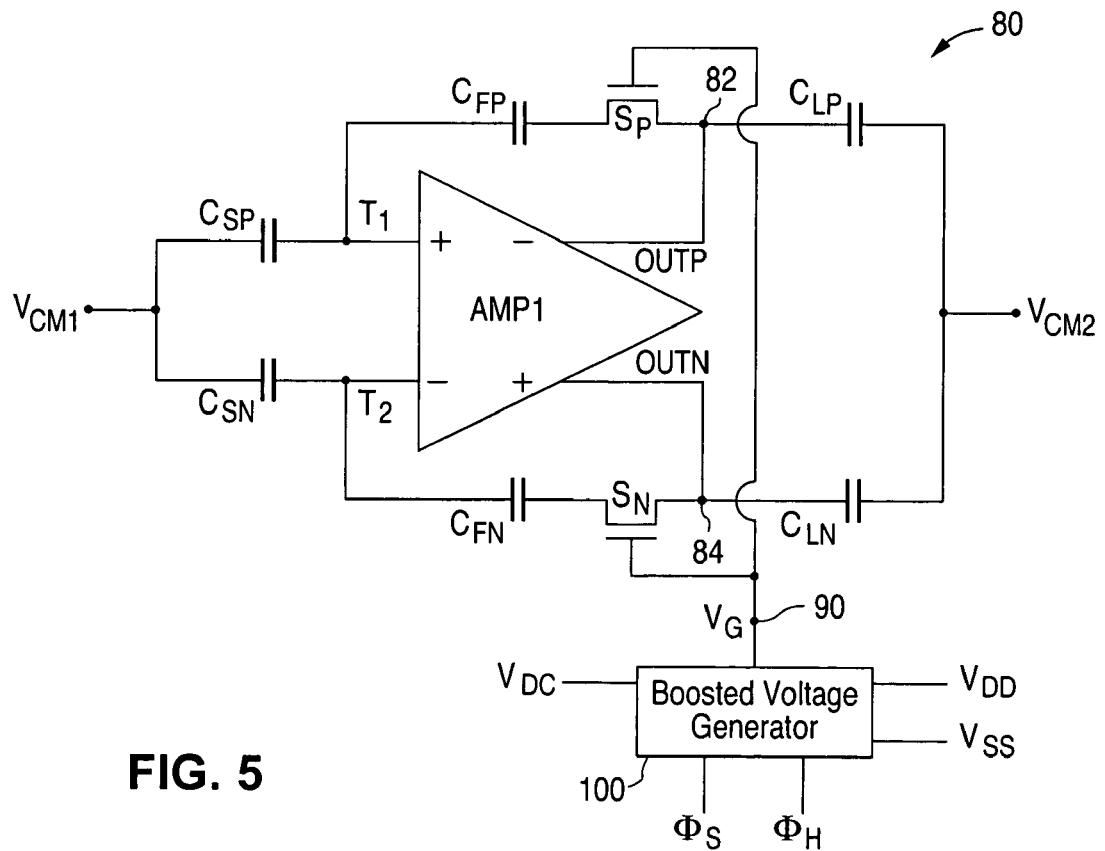
FIG. 5 is a circuit diagram of a switched capacitor circuit including a boosted voltage generator according to one embodiment of the present invention.

FIG. 5 is a circuit diagram of a switched capacitor circuit including a boosted voltage generator according to one embodiment of the present invention. Referring to FIG. 5, the switched capacitor circuit 80 has a basic configuration that is the same as the switched capacitor circuit of FIG. 1. Specifically, the switched capacitor circuit 80 includes an amplifier AMP1 with input terminals T1 and T2 coupled to a pair of sampling capacitors $C_{SP}$ and $C_{SN}$. Sampling capacitors $C_{SP}$ and $C_{SN}$ are switchably connected to a first DC common mode voltage $V_{CM1}$. The switches connecting the left plate of sampling capacitors $C_{SP}$ and $C_{SN}$ to common mode voltage $V_{CM1}$ are not shown in FIG. 5 to simplify the drawing. Typically, the switches connecting the common mode voltage $V_{CM1}$ to the sampling capacitors are made to be large enough to reduce "on" resistance without limiting overall circuit performance in terms of stability and settling time.

Switched capacitor circuit 80 also includes a pair of feedback capacitors $C_{FP}$ and $C_{FN}$. The left plates of the feedback capacitors $C_{FP}$ and $C_{FN}$ are connected back to the respective input terminals T1 and T2 of the amplifier AMP1. The right plates of the feedback capacitors $C_{FP}$ and $C_{FN}$ are connected through respective switches $S_P$ and $S_N$ to the output terminals OUTP and OUTN of amplifier AMP1. Finally, switched capacitor circuit 80 includes a pair of loading capacitors $C_{LP}$ and $C_{LN}$ switchably connected to the output terminals OUTP, OUTN of amplifier AMP1. The switches between the loading capacitors $C_{LP}$ and $C_{LN}$ and output terminals OUTP and OUTN are omitted in FIG. 5 to simplify the drawing. Typically, the switches connected to the output terminals OUTP, OUTN of amplifier AMP1 are less sensitive to settling time and stability issues and therefore are not critical with respect to the performance of the switched capacitor circuit. The right plates of loading capacitors $C_{LP}$ and $C_{LN}$ are connected to a second DC common mode voltage $V_{CM2}$.

In accordance with the present invention, the feedback switches $S_P$ and $S_N$ are each implemented as a single NMOS transistor, instead of a transmission gate. Furthermore, the size of the NMOS transistors implementing switches $S_P$ and $S_N$ is kept small to minimize parasitic capacitance introduced by the transistors. Furthermore, the NMOS transistors $S_P$ and $S_N$ are driven by a constant boosted voltage $V_G$ (node 90) to turn the transistors on when the feedback switches are to be closed.

The constant boosted voltage $V_G$ (node 90) is generated by a boosted voltage generator 100. Boosted voltage $V_G$ provides a gate voltage to NMOS transistors $S_P$ and $S_N$ having as large a voltage value as possible to ensure a low "on" resistance when the transistors are turned on. Also, boosted voltage $V_G$ is supply voltage independent so that the boosted voltage value does not vary with variations in the power supply voltage $V_{DD}$. In particular, the boosted voltage $V_G$ is generated directly from the power supply voltage $V_{DD}$ so that the settling time on the feedback switch is faster and less noisy than when the boosted voltage is driven by other circuitry such as an amplifier.

In one embodiment, the boosted voltage $V_G$ on node 90 is generated from a precharge voltage and the boosted voltage generator 100 is constructed in a manner so as to isolate the boosted voltage node from the precharge voltage when the boosted voltage is being utilized. Accordingly, a low speed and noisy amplifier output voltage can be used as the precharge voltage source for the boosted voltage generator 100, as will be described in more detail below.

In one embodiment, the desired value for the constant boosted voltage $V_G$ is determined as follows. Assume that the output common mode voltage of the amplifier (AMP1) is 1.5V and the output voltage on each of the amplifier's output nodes OUTP and OUTN is varying from 1.0V to 2.0V for a 2.0 VP-P output swing with a 3.0V power supply $V_{DD}$ voltage, the lowest voltage at the amplifier output terminals is 1.0V. For a given fabrication process, there is a maximum gate-to-source/drain voltage which can be applied to the NMOS transistors without reliability degradation. Assume in the present case that the maximum gate-to-source/drain voltage of the NMOS transistor used to implement switches $S_P$ and $S_N$ is about 3.8V for a 0.35 µm process without causing any long term device reliability issue. Thus, the maximum boosted gate voltage for the above condition is 4.8V, which is the sum of 3.8V from the gate-to-source/drain node of the NMOS transistor and the 1.0V on one of amplifier AMP1 output terminal OUTP or OUTN. When the constant boosted voltage value is thus selected, the switch "on" resistance when the amplifier output voltage is at 2.0V can still be kept small enough for high resolution and high speed operation because in that case, the voltage from the gate to source/drain node is 2.8V. In other words, the maximum boosted voltage $V_G$ is determined as the sum of the maximum gate-to-source voltage allowable under the process and the lowest source voltage that would be experienced by the transistor in the circuit.

Figure 6:
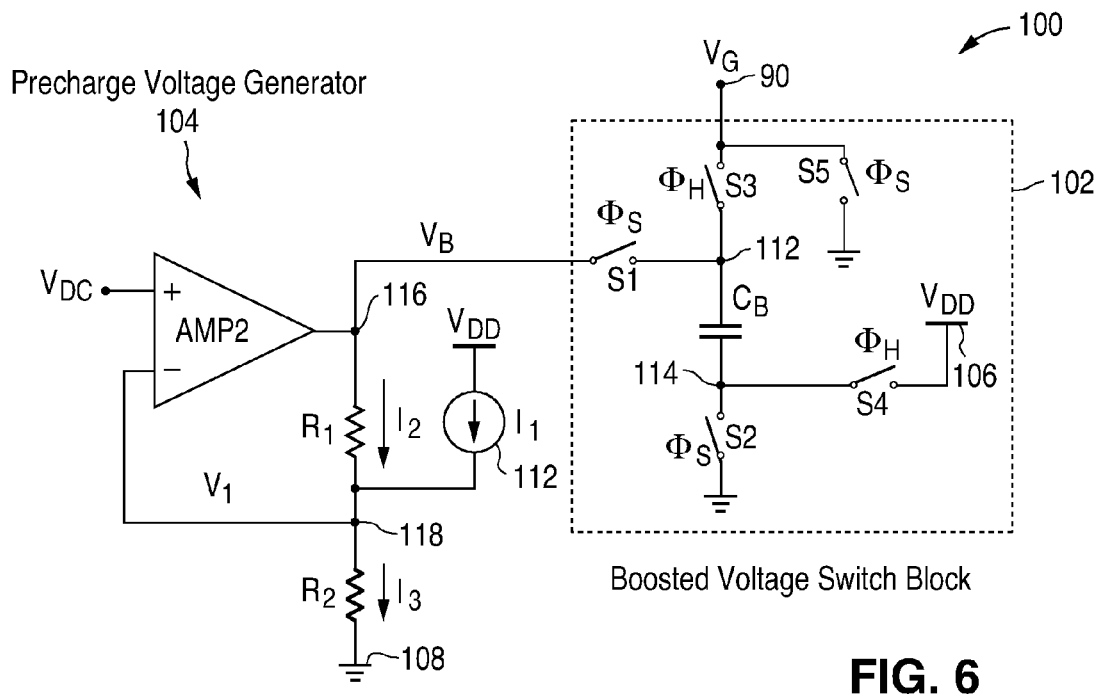
FIG. 6 is a circuit diagram of a boosted voltage generator circuit according to one embodiment of the present invention.

FIG. 6 is a circuit diagram of a boosted voltage generator circuit according to one embodiment of the present invention. Referring to FIG. 6, boosted voltage generator circuit 100 includes a boosted voltage switch block 102 and a precharge voltage generator 104. Boosted voltage switch block 102 is operated under the timing control of clock signals $\Phi_S$ and $\Phi_H$ to either allow a boosting capacitor $C_B$ to be precharged under a "sample" phase or to connect the boosting capacitor $C_B$ to the boosted voltage node to provide the boosted voltage $V_G$ under a "hold" phase. Precharge voltage generator 104 generates the precharge voltage for precharging the boosting capacitor $C_B$.

In the present description, it is assumed that clocks $\Phi_S$ and $\Phi_H$ are complementary, i.e., have opposite logical states. Furthermore, it is assumed that clock $\Phi_S$ has a logical high value when asserted to put the boosted voltage switch block 102 into the sample phase and similarly, clock $\Phi_H$ has a logical high value when asserted to put the boosted voltage switch block 102 into the hold phase. In operation, the "sample" phase corresponds to the "precharge" phase while the "hold" phase corresponds to the "voltage boosting" phase of the boosted voltage generator circuit 100.

More specifically, precharge voltage generator 104 generates a precharge voltage $V_B$ on a node 116 for precharging the boosting capacitor $C_B$. The precharge voltage $V_B$ is coupled to drive the top plate of boosting capacitor $C_B$ through a switch S1 driven by clock $\Phi_S$. The bottom plate of boosting capacitor $C_B$ is driven by the power supply voltage $V_{DD}$ through a switch S4 driven by clock $\Phi_H$. The $V_{DD}$ connection at the bottom plate of capacitor $C_B$ is to ensure that when the boosted voltage $V_G$ is applied to drive the feedback switches, the fastest settling time on the gate terminal of the feedback switch $S_P$ or $S_N$ is attained.

In operation, the DC precharge voltage $V_B$ is sampled across the boosting capacitor $C_B$ during the sample phase under the control of clock $\Phi_S$. Specifically, switches S1 and S2 are closed while switches S3 and S4 are open so that boosting capacitor $C_B$ is precharged to the DC precharge voltage $V_B$. Then, during the hold phase under the control of clock $\Phi_H$, switches S1 and S2 are open while switches S3 and S4 are clocked. The bottom place of capacitor $C_B$ is thus connected to the power supply voltage $V_{DD}$. The bottom plate of boosting capacitor $C_B$ is pushed up to the power supply voltage $V_{DD}$ and the top plate of boosting capacitor $C_B$ is consequently pumped up to a boosted voltage value. Thus, the boosted voltage $V_G$ on node 90 is given as: $V_G=V_{DD}+V_B$.

The DC precharge voltage $V_B$ generated by the precharge voltage generator is inversely proportional to the power supply voltage $V_{DD}$ so as to keep the boosted voltage $V_G$ as high as possible regardless of variations in the power supply voltage $V_{DD}$. As a result, the smallest switch "on" resistance at the NMOS transistor is realized while achieving fast settling time without causing long term reliability issues.

The DC precharge voltage $V_B$ is generated based on a constant DC voltage $V_{DC}$ and the power supply voltage $V_{DD}$. The voltage $V_{DC}$ can be generated from an internal reference voltage generator in the integrated circuit in which the switched capacitor circuit is implemented. The manner in which DC voltage $V_{DC}$ is generated is not critical to the practice of the present invention.

The precharge voltage $V_B$ is generated using a non-inverting feedback circuit including an amplifier AMP2 and a supply voltage dependent current source 112. Current source 112 provides a current $I_1$ from the power supply voltage $V_{DD}$ to the negative (or inverting) input terminal 118 of amplifier AMP2. The positive (or non-inverting) input terminal of amplifier AMP2 receives the constant DC voltage $V_{DC}$. A resistor network including resistors $R_1$ and $R_2$ is coupled to form the feedback circuit for amplifier AMP2. Specifically, resistor $R_1$ is connected between the output node 116 of amplifier AMP2 and the negative input node 118 while resistor $R_2$ is connected between the negative input node 118 and the ground node. As thus configured, the precharge voltage $V_B$ is given as:

$$V_B = V_{DC} \frac{R_1 + R_2}{R_2} - I_1 \times R_1,$$

where the proportional-to-$V_{DD}$ current $I_1$ is equal to $V_{DD}/R_1$. For instance, when the resistance of resistor $R_1$ is 3.8 times larger than the resistance of resistor $R_2$ and voltage $V_{DC}$ is 1.0V, precharge voltage $V_B$ is 1.8V when the $V_{DD}$ voltage is 3.0V and precharge voltage $V_B$ is 1.2V when the $V_{DD}$ voltage is 3.6V.

The generation of the precharge voltage $V_B$ can be derived as follows. First, boosted voltage $V_G$ is given as:

$$V_G = V_{DD} + V_B, \qquad \text{Eq. (1)}$$

wherein voltage $V_B$ tracks the variations in $V_{DD}$ and changes inversely proportionally to voltage $V_{DD}$. Thus, the precharge voltage that is desired is:

$$V_B = V_G - V_{DD}. \qquad \text{Eq. (2)}$$

In order to generate the desired voltage $V_B$, voltage $V_G$ is set as:

$$V_G = \left(1 + \frac{R1}{R2}\right)V_{DC}, \qquad \text{Eq. (3)}$$

through the non-inverting feedback circuit around amplifier AMP2.

In precharge voltage generator 104, voltage $V_{DD}$ is equal to $I_2R_1$ and voltage $V_B$ can be expressed as follows:

$$V_B = V_{DC} + I_2R_1. \qquad \text{Eq. (4)}$$

Because $I_2 = I_3 - I_1$ and $I_3 = V_{DC}/R_2$, the current $I_2$ can be expressed as follows:

$$I_2 = V_{DC}/R_2 - I_1. \qquad \text{Eq. (5)}$$

When Eq. (5) is substituted into the Eq. (4), the voltage $V_B$ can be expressed as follows:

$$V_B = V_{DC} + (V_{DC}/R_2 - I_1)R_1, \qquad \text{Eq. (6)}$$
$$= V_{DC} + R_1/R_2 V_{DC} - I_1R_1,$$
$$= (1 + R_1/R_2)V_{DC} - I_1R_1.$$

If current $I_1$ is set to $V_{DD}/R_1$, then voltage $V_B$ can be expressed as:

$$V_B = (1 + R_1/R_2)V_{DC} - V_{DD}. \qquad \text{Eq. (7)}$$

The first term in Eq. (7) can be substituted by Eq. (3) above so that the desired voltage $V_B = V_G - V_{DD}$ is obtained.

Because current $I_1$ is based on a resistance ratio of the $V_{DD}$ voltage, voltage $V_B$ is thus made to be inversely proportional to changes in the $V_{DD}$ voltage, effectuating the cancellation of the $V_{DD}$ voltage at the boosted voltage node.

In an alternate embodiment, current $I_1$ is generated by a voltage value of $V_{DD}/2$ instead of the $V_{DD}$ voltage value and the resistance values of resistors $R_1$ and $R_2$ are adjusted to obtain the same current value.

In the present implementation, amplifier AMP2 does not need to be a fast amplifier as the amplifier only needs to generate the precharge voltage which is stored on a capacitor.

Figure 7:
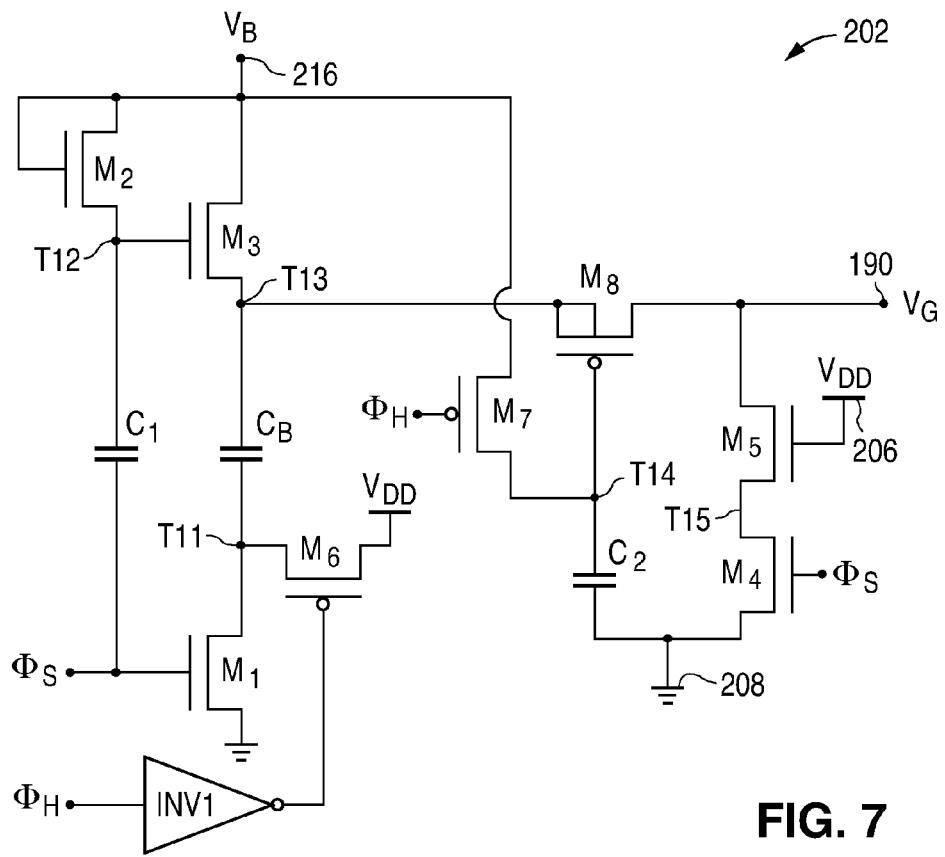
FIG. 7 is a transistor-level circuit diagram of the boosted voltage switch block in the boosted voltage generator circuit according to one embodiment of the present invention.

FIG. 7 is a transistor-level circuit diagram of the boosted voltage switch block in the boosted voltage generator circuit according to one embodiment of the present invention. Referring to FIG. 7, boosted voltage switch block 202 receives the precharge voltage $V_B$ on a node 216. Boosted voltage switch block 202 includes a diode-connected NMOS transistor $M_2$ connected in series with a capacitor $C_1$. Transistor $M_2$ couples the precharge voltage $V_B$ to a node T12 which is the top plate of capacitor $C_1$. The bottom plate of capacitor $C_1$ is driven by the clock signal $\Phi_S$. Thus, during the hold (voltage boosting) phase, clock signal $\Phi_S$ is at a logical low level and capacitor $C_1$ is precharged to a voltage value equaling the precharge voltage $V_B$ less the threshold voltage $V_{TH}$ of transistor $M_2$. Node T12 is thus at a voltage value near the precharge voltage value $V_B$. Then, during the sample (precharge) phase, clock signal $\Phi_S$ is at a logical high level and the voltage level at the bottom plate of capacitor $C_1$ is pushed up, such as to the $V_{DD}$ voltage. The top plate of capacitor $C_1$ (node T12) is accordingly pushed up from its original precharge value so that a sufficiently large voltage is available to drive the gate terminal of transistor $M_3$.

Accordingly, during the sample (precharge) phase under the control of clock $\Phi_S$, the voltage on node T12 (the top plate of capacitor $C_1$) is high enough to turn on NMOS transistor $M_3$ so that the precharge voltage $V_B$ is connected to a node T13 which is the top plate of boosting capacitor $C_B$. NMOS transistor $M_1$ is simultaneously turned on under the control of clock $\Phi_S$ to connect the bottom plate of boosting capacitor $C_B$ to the ground or $V_{SS}$ voltage. Precharge voltage $V_B$ is thus applied across the boosting capacitor $C_B$ to precharge the capacitor.

At this time (the sample phase), transistor $M_4$ is turned on by clock $\Phi_S$ to discharge the boosted voltage node 190 to the ground or $V_{SS}$ voltage (node 208). Transistor $M_5$ is provided to protect transistor $M_4$ during the voltage boosting phase. Transistor $M_5$ is always turned on because its gate terminal connected to the power supply $V_{DD}$ voltage (node 206). In this manner, the boosted voltage node 190 is pull down to ground or Vss voltage when the feedback switches are to be turned off.

Meanwhile, during this sample phase, a capacitor $C_2$ is also being precharged with voltage $V_B$ because PMOS transistor $M_7$ is turned on by the logical low level of clock $\Phi_H$ in the sample phase. Transistor $M_8$, in turn, is turned off by the precharged voltage $V_B$ stored on capacitor $C_2$, thereby isolating the boosted voltage node 190 from the boosting capacitor $C_B$.

Subsequently, during the hold (voltage boosting) phase under the control of clock $\Phi_H$, the bottom plate of capacitor $C_B$ (node T11) is disconnected from ground and is connected to the power supply voltage $V_{DD}$ through a PMOS transistor $M_6$. PMOS transistor $M_6$ is turned on by the inverse of the clock signal $\Phi_H$ where clock signal $\Phi_H$ has a logical high value during the hold phase. The top plate of capacitor $C_B$ (node T13) is shifted up to a voltage value of $V_{DD}+V_B$ and this voltage is applied to the boosted voltage node 190 through transistor $M_8$ as the boosted voltage $V_G$. During the hold (voltage boosting) phase, transistor $M_7$ is turned off to disconnect the gate terminal (node T14) of transistor $M_8$ from being driven by precharge voltage $V_B$. However, capacitor $C_2$ holds the precharge voltage value. The voltage difference between the boosted voltage value $V_{DD}+V_B$ on the source terminal (node T13) of transistor $M_8$ relative to the precharge voltage $V_B$ on the gate terminal of transistor $M_8$ turns on the PMOS transistor. The NWELL node of PMOS transistor $M_8$ is tied to its source node (node T13) because the voltage at node T13 is always higher than the boosted voltage $V_G$ at node 190 or at least the two voltages are the same.

In operation, if node T14 (the gate terminal of transistor $M_8$) is directly connected to the precharge voltage $V_B$, transistor $M_8$ will be turned on as soon as clock $\Phi_H$ goes high and the transistor size can be minimized due to the maximum gate-to-source voltage applied to the gate-to-source terminals, which is the same as the $V_{DD}$ voltage. However, as shown in FIG. 6, the precharge voltage $V_B$ (node 116) is driven by amplifier AMP2 and amplifier AMP2 output settling time cannot be as fast as that of voltage $V_{DD}$. Also amplifier AMP2 output node is vulnerable to kick back voltages due to capacitive coupling. If any temporal noise appears on the precharge voltage $V_B$ node during the hold (voltage boosting) phase, the noise will contaminate the analog signal fidelity of the switched capacitor circuit and the performance of the switched capacitor circuit may be adversely affect. Therefore, it is not desirable to connect the precharge voltage $V_B$ directly to gate terminal of transistor $M_8$.

In accordance with the present invention, the noisy precharge voltage $V_B$ node is completely isolated from the boosted voltage $V_G$ signal path. The boosted voltage signal path runs from the $V_{DD}$ voltage coupled to the source terminal of transistor $M_6$, through capacitor $C_B$, to the boosted voltage $V_G$ node 190. By isolating the precharge voltage form the boosted voltage signal path, even though voltage $V_B$ has not settled completely or is noisy during the precharge phase, the voltage across capacitor $C_B$ is kept as constant as possible during the voltage boosting phase without any temporal noise.

In sum, capacitor $C_2$ and PMOS transistor $M_7$ operate to sample and store precharge voltage $V_B$ during the sample (precharge) phase and the noisy precharge voltage $V_B$ is isolated from the gate terminal of transistor $M_8$ during the hold (voltage boosting) phase. The size of transistor $M_7$ can be minimized because capacitor $C_2$ is always charged up to voltage $V_B$ and when PMOS transistor $M_7$ is turned on, only a small amount of charge injection is required to charge up capacitor $C_2$. As a result of the precharge voltage sampling operation provided by transistor $M_7$ and capacitor $C_2$, the gate terminal of transfer switch $M_8$ is kept at the boosted voltage $V_B$ for fast settling time without introducing any noise coupling from the boosted voltage node 216 to the gate terminal of the feedback switch coupled to the boosted voltage node 190.

As thus constructed, the boosted voltage generator circuit of the present invention generates a boosted voltage $V_G$ that is the highest voltage not causing device reliability issue so that a single small NMOS transistor can be used to implement the feedback switch. The fastest settling time is achieved by using the $V_{DD}$ voltage to drive the feedback switch through a boosting capacitor $C_B$.

Figure 8:
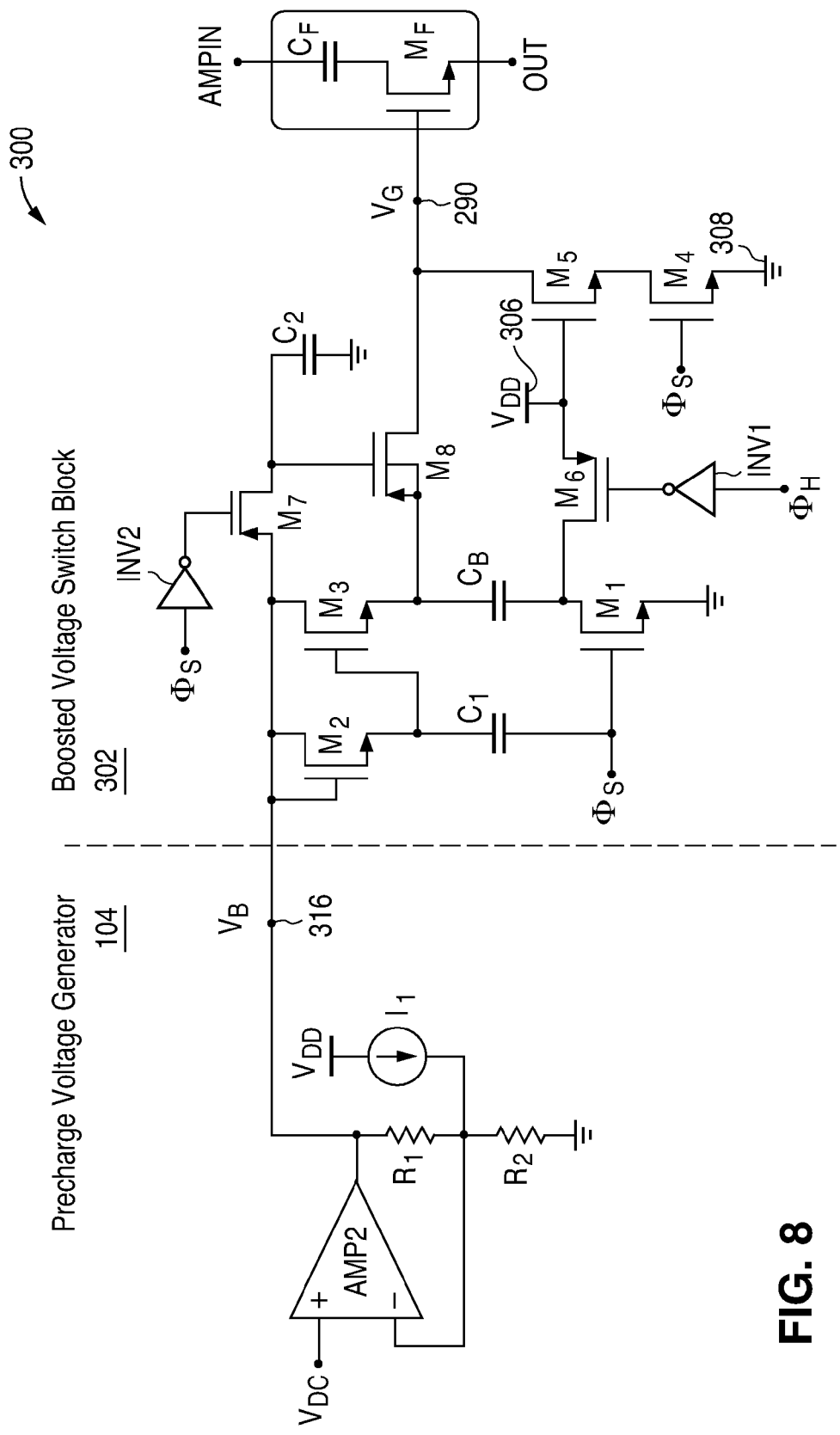
FIG. 8 is a circuit diagram of a boosted voltage generator circuit according to a second embodiment of the present invention.

FIG. 8 is a circuit diagram of the entire boosted voltage generator circuit according to one embodiment of the present invention. In FIG. 8, an NMOS transistor $M_F$ is used to model the feedback switch and a feedback capacitor $C_F$ is coupled between transistor $M_F$ and an input terminal of the amplifier.

Referring to FIG. 8, while the gate voltage of pass transistor $M_8$ is the same as voltage $V_B$, transistor $M_8$ has an "on" resistance that is the lowest during the voltage boosting phase without introducing device reliability issues to the transistor. As described with respect to FIG. 7, voltage $V_B$ is sampled onto capacitor $C_2$ by turning on PMOS transistor $M_7$ during the precharge phase. Hence, any capacitive noise coupling from the precharge voltage $V_B$ node to the boosted voltage signal path is completely prevented during the voltage boosting phase. Signal interferences between blocks can deteriorate the performance of the circuit to which the boosted voltage $V_G$ is applied since all boosted feedback circuits will share the common $V_B$ node. Thus, the sampled gate voltage technique applied to transistor $M_8$ ensures sufficient noise isolation.

The above detailed descriptions are provided to illustrate specific embodiments of the present invention and are not intended to be limiting. Numerous modifications and variations within the scope of the present invention are possible. For example, the transistor level circuit diagrams described above illustrate the use of N-channel or P-channel MOSFET or MOS transistors to construct the boosted voltage generator circuit. One of ordinary skill in the art would appreciate that the boosted voltage generator circuit can be constructed using MOS transistors of the opposite polarities as long as the control voltages are modified accordingly. The present invention is defined by the appended claims.

I claim:

1. A boosted voltage generator circuit, comprising:
   a precharge voltage generator circuit for receiving a first DC voltage and a first power supply voltage of $V_{DD}$ and generating a precharge voltage having a first voltage value on a precharge voltage node, the precharge voltage being inversely proportional to variations in the first power supply voltage, the precharge voltage generator circuit comprising:
   an amplifier having a non-inverting input terminal coupled to receive the first DC voltage having a voltage value of $V_{DC}$, an inverting input terminal coupled to a first node, and an output terminal being the precharge voltage node providing the precharge voltage;
   a first resistor coupled between the output terminal of the amplifier and the first node, the first resistor having a resistance value of R1;

a second resistor coupled between the first node and the second power supply voltage, the second resistor having a resistance value of R2; and a current source providing a current to the first node being proportional to the first power supply voltage, wherein the precharge voltage is denoted as $V_B$ and has a value given as $V_B=(1+R_1/R_2)V_{DC}-V_{DD}$; and a first capacitor having a first plate switchably connected to the precharge voltage node and switchably connected to a boosted voltage output node and a second plate switchably connected to the first power supply voltage and switchably connected to a second power supply voltage, wherein the first capacitor is connected between the precharge voltage node and the second power supply voltage during a first phase to be precharged to the precharge voltage and the first capacitor is connected between the boosted voltage output node and the first power supply voltage during a second phase to apply a boosted voltage at the boosted voltage output node where the boosted voltage has a voltage value being the sum of the precharge voltage and the first power supply voltage and being independent of the first power supply voltage where the boosted voltage, denoted as $V_G$, is given as $V_G=(1+R_1/R_2)V_{DC}$;

wherein:

the third switch comprises a first MOS transistor having a first current handling terminal coupled to the first plate of the first capacitor, a second current handling terminal coupled to the boosted voltage output node and a control terminal coupled to a second capacitor and a second MOS transistor to receive a control voltage; and the second capacitor has a first plate coupled to the control terminal of the first MOS transistor and a second plate coupled to the second power supply voltage;

the second MOS transistor has a first current handling terminal coupled to the control terminal of the first MOS transistor, a second current handling terminal coupled to the precharge voltage node and a control terminal receiving a control voltage indicative of the second clock signal, wherein the second MOS transistor is turned on during the first phase to connect the control terminal of the first MOS transistor to the precharge voltage node, thereby precharging the second capacitor to the precharge voltage, and the second MOS transistor is turned off during the second phase to isolate the control terminal of the first MOS transistor from the precharge voltage node.

2. The boosted voltage generator circuit of claim 1, wherein the boosted voltage output node is switchably connected to the second power supply voltage, wherein the boosted voltage output node is connected to the second power supply voltage during the first phase to discharge the boosted voltage output node.

3. The boosted voltage generator circuit of claim 1, further comprising:

a first switch having a first terminal coupled to the precharge voltage node and a second terminal coupled to the first plate of the first capacitor, the first switch being controlled by a first clock signal;

a second switch having a first terminal coupled to the second plate of the first capacitor and a second terminal coupled to the second power supply voltage, the second switch being controlled by the first clock signal;

a third switch having a first terminal coupled to the first plate of the first capacitor and a second terminal coupled to the boosted voltage output node, the third switch being controlled by a second clock signal, the second clock signal being complementary to the first clock signal; and a fourth switch having a first terminal coupled to the second plate of the first capacitor and a second terminal coupled to the first power supply voltage, the fourth switch being controlled by the second clock signal.

4. The boosted voltage generator circuit of claim 3, further comprising a fifth switch having a first terminal coupled to the boosted voltage output node and a second terminal coupled to the second power supply voltage, the fifth switch being controlled by the first clock signal.

5. The boosted voltage generator circuit of claim 1, wherein the boosted voltage is coupled to drive an NMOS transistor and the boosted voltage has a value being the maximum gate-to-source voltage permitted for the NMOS transistor and the minimum voltage that can be experienced by the NMOS transistor at the source or drain terminal.

6. The boosted voltage generator circuit of claim 5 wherein the maximum gate-to-source voltage permitted for the NMOS transistor is determined by the fabrication process in which the NMOS transistor is manufactured.

7. The boosted voltage generator circuit of claim 1, wherein the first MOS transistor comprises a PMOS transistor fabricated in an N-well, the N-well being electrically connected to the first current handling terminal of the first MOS transistor.

8. The boosted voltage generator circuit of claim 3, wherein the first switch comprises:

a third MOS transistor having a first current handling terminal coupled to the first plate of the first capacitor, a second current handling terminal coupled to the precharge voltage node and a control terminal;

a third capacitor having a first plate coupled to the control terminal of the third MOS transistor and a second plate coupled to the first clock signal; and a fourth MOS transistor having a first current handling terminal and a control terminal coupled to the precharge voltage node and the second current handling terminal coupled to the first plate of the third capacitor.

9. The boosted voltage generator circuit of claim 8, wherein the third and fourth MOS transistors comprise NMOS transistors.

10. The boosted voltage generator circuit of claim 1, wherein the current source is coupled to the first power supply voltage to generate the current being proportional to the first power supply voltage and independent of the first DC voltage.

11. The boosted voltage generator circuit of claim 1, wherein the current source is coupled to a voltage indicative of the first power supply voltage to generate the current being proportional to the first power supply voltage and independent of the first DC voltage.

* * * * *